United States Patent
Sung et al.

(10) Patent No.: US 9,344,862 B2
(45) Date of Patent: May 17, 2016

(54) SYSTEM AND METHOD FOR PROVIDING CONVERGED MESSAGING SERVICE

(75) Inventors: Sang-Kyung Sung, Seoul (KR); Kyung-Tak Lee, Yongin-si (KR); Wuk Kim, Gwacheon-si (KR); Jae-Kwon Oh, Seoul (KR); Seung-Yong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1341 days.

(21) Appl. No.: 11/939,172

(22) Filed: Nov. 13, 2007

(65) Prior Publication Data

US 2008/0113679 A1 May 15, 2008

(30) Foreign Application Priority Data

Nov. 13, 2006 (KR) .................... 10-2006-0111614

(51) Int. Cl.
*H04W 4/12* (2009.01)
*H04L 12/58* (2006.01)

(52) U.S. Cl.
CPC ............. *H04W 4/12* (2013.01); *H04L 12/5835* (2013.01); *H04L 12/5895* (2013.01); *H04L 51/066* (2013.01); *H04L 51/38* (2013.01); *H04L 12/581* (2013.01); *H04L 51/04* (2013.01)

(58) Field of Classification Search
CPC ... H04L 12/58; H04L 12/581; H04L 12/5825; H04L 12/5835; H04L 12/589; H04L 51/04; H04L 51/06; H04L 51/066; H04L 65/601; H04L 67/2823; H04M 2203/4509; H04W 4/12; H04W 4/14; H04W 4/18; H04W 80/10
USPC ......... 455/414.1–414.4, 432.2, 466; 370/466; 709/230

See application file for complete search history.

(56) References Cited

U.S. PATENT DOCUMENTS

2002/0073205 A1*  6/2002  Mostafa ..................... 709/227
2004/0187021 A1   9/2004  Rasanen
(Continued)

FOREIGN PATENT DOCUMENTS

| KR | 1020050100550 | 10/2005 |
| KR | 1020050103151 | 10/2005 |
| WO | WO 2005/027459 | 3/2005 |
| WO | WO 2005/117469 | 12/2005 |

OTHER PUBLICATIONS

Samsung: "CR to 24.206: Signalling Flows for Unsuccessful Delivery of Terminating Call and Subsequent Reselection of Domain for Call Delivery", 3GPP TSG-CT1 Meeting #42bis, Tdoc C1-061290, Jul. 9, 2006.

(Continued)

*Primary Examiner* — Michael Mapa
(74) *Attorney, Agent, or Firm* — The Farrell Law Firm, P.C.

(57) ABSTRACT

Provided is a system and method for providing a converged messaging service, which can be compatibly used with or replace various services, such as an Instant Messaging (IM) service, a Short Message Service (SMS), a Multimedia Message Service (MMS), a Voice over Internet Protocol (VoIP) service, and a PTT over Cellular (PoC) service. To do this, there are defined an architecture and interfacing of a Converged Messaging Client (CMC) and a CM Server (CMS), which are elements of a converged messaging service for being compatibly used with or replacing the various services. In particular, there is suggested a method of enabling interworking between heterogeneous messaging services in an application layer by expending IP Multimedia Core Network (CN) Subsystem (IMS) technology. There is also suggested a method of defining a CM data storage for supporting the converged messaging service and managing a message and metadata stored in the defined CM data storage.

20 Claims, 6 Drawing Sheets

(56) References Cited

U.S. PATENT DOCUMENTS

| | | | | |
|---|---|---|---|---|
| 2004/0225753 A1* | 11/2004 | Marriott et al. | | 709/246 |
| 2005/0170855 A1* | 8/2005 | Comer et al. | | 455/466 |
| 2005/0243978 A1* | 11/2005 | Son et al. | | 379/88.13 |
| 2006/0247885 A1* | 11/2006 | Manfredi | | 702/120 |
| 2007/0136475 A1* | 6/2007 | Leppisaari et al. | | 709/227 |
| 2007/0156909 A1* | 7/2007 | Osborn et al. | | 709/227 |
| 2007/0168449 A1* | 7/2007 | Malik et al. | | 709/207 |
| 2008/0008106 A1* | 1/2008 | Boberg et al. | | 370/270 |

OTHER PUBLICATIONS

Ericsson et al., "IMS-SMS Interworking as a Terminating Service", 3GPP TSG SA WG2 Architecture—S2#54, S2-062809, Aug. 22, 2006.

Korean Office Action dated Jan. 15, 2015 issued in counterpart application No. 10-2007-0115761.

* cited by examiner

Note: Terminating Filter Criteria is indexed based on the Request-URI..

CASE method="INVITE" AND header="Accept-Contact" = "+g.poc.talkburst"
    THEN: ROUTE request to the specified PoC Server Originating Port Address
CASE method="MESSAGE" AND header="Accept-Contact" = "+g.poc.talkburst"
    THEN: ROUTE request to the specified PoC Server Originating Port Address
CASE method="MESSAGE" AND header="Accept-Contact" = "+g.poc.groupad"
    THEN: ROUTE request to the specified PoC Server Originating Port Address
CASE method="SUBSCRIBE" AND header="Accept-Contact" = "+g.poc.talkburst"
    THEN:  ROUTE request to the specified PoC Server Originating Port Address
<u>CASE method="INVITE" AND header="Accept-Contact" = "+g.oma.cpm"</u>
    <u>THEN: ROUTE request to the specified PoC Server Originating Port Address</u>
<u>CASE method="MESSAGE" AND header="Accept-Contact" = "+g.oam.cpm"</u>
    <u>THEN: ROUTE request to the specified PoC Server Originating Port Address</u>

SYSTEM AND METHOD FOR PROVIDING CONVERGED MESSAGING SERVICE

PRIORITY

This application claims the priority under 35 U.S.C. §119(a) to a Patent Application filed in the Korean Intellectual Property Office on Nov. 13, 2006 and assigned Serial No. 2006-111614, the contents of which are incorporated herein by reference.

BACKGROUND OF THE INVENTION

1. Field of the Invention

The present invention relates generally to a messaging service, and in particular, to a system and method for providing a converged messaging service, which can be compatibly used with or replace various services, such as an Instant Messaging (IM) service, a Short Message Service (SMS), a Multimedia Message Service (MMS), a Voice over Internet Protocol (VoIP) service, and a Push To Talk (PTT) over Cellular (PoC) service.

2. Description of the Related Art

In general, messaging services include a Short Message Service (SMS) and a Multimedia Message Service (MMS) for transmitting and receiving a message between terminals, which do not support an Instant Messaging (IM) service, and the IM service and a Push To Talk (PTT) over Cellular (PoC) service for transmitting and receiving a message between terminals, which support the IM service.

A system for providing the SMS, which is a general one of the messaging services described above, is illustrated in FIG. 1. A process of transmitting and receiving a message between a terminal 110 and a Short Message (SM) server 100 in a system for providing the SMS will now be described with reference to FIG. 1.

Figure 1:
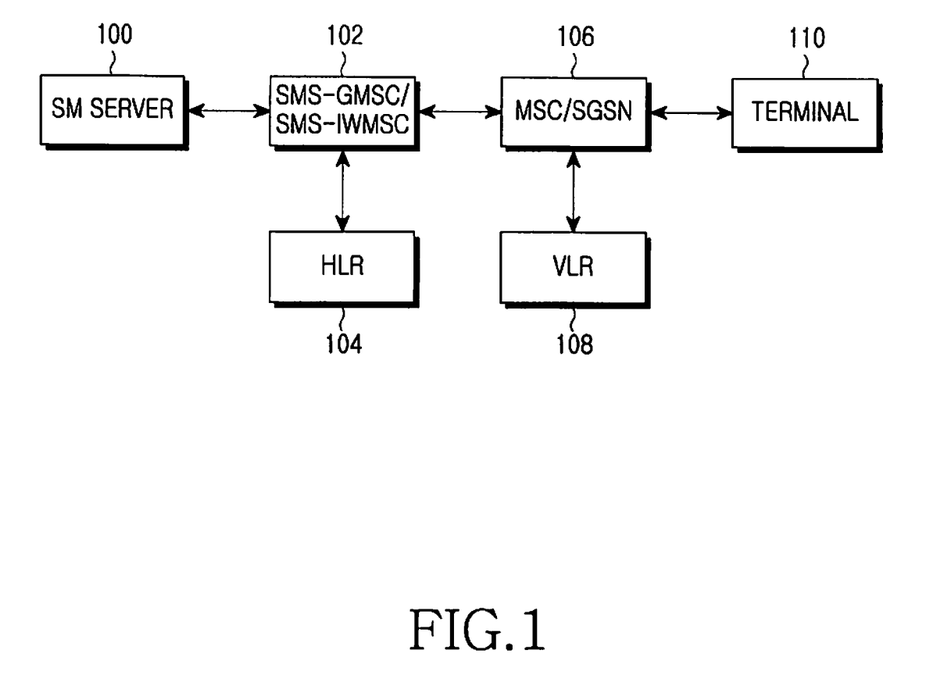
FIG. 1 is a block diagram for describing a process of transmitting a message between a terminal and a Short Message (SM) server in a conventional system for providing a Short Message Service (SMS)

A process of transmitting a message from the terminal 110 to the SM server 100 is described first. It is assumed that the terminal 110 is a sender's terminal for transmitting a message.

The terminal 110 creates a message to be transmitted and transmits the message to a Mobile service Switching Center (MSC) 106. In this case, the terminal 110 may transmit the message to a Serving General Packet Radio Service (GPRS) Support Node (SGSN) 106 instead of the MSC. If the size of the message to be transmitted exceeds a defined size, the terminal 110 divides the message having the large size into a plurality of messages having a small size and transmits the plurality of messages having the small size. When the MSC 106 receives the message from the terminal 110, the MSC 106 receives necessary information from a Visitor Location Register (VLR) 108, determines whether the received information has an error, and transmits the message to an SMS-Inter Working MSC (SMS-IWMSC) 102 if it is determined that the received information has no error. If the terminal 110 transmits the message to the SGSN 106, the SGSN 106 checks a Reply Path-Destination Address (RP-DA) parameter contained in the message, and if there is no error, the SGSN 106 transmits the message to the SMS-IWMSC 102. When the SMS-IWMSC 102 receives the message, the SMS-IWMSC 102 receives necessary information from a Home Location Register (HLR) 104 and transmits the message to the SM server 100.

A process of transmitting a message from the SM server 100 to the terminal 110 is described. In this case, it is assumed that the terminal 110 is a recipient's terminal for receiving a message.

When the SM server 100 receives an SM message from the sender's terminal as described above, the SM server 100 stores the SM message therein and transmits the SM message to an SMS-Gateway MSC (SMS-GMSC) 102. When the SMS-GMSC 102 receives the SM message, the SMS-GMSC 102 receives routing information from the HLR 104 and transmits the SM message to the corresponding MSC or SGSN 106. If the MSC 106 receives the SM message from the SMS-GMSC 102, the MSC 106 receives location information from the VLR 108 and transmits the SM message to the terminal 110. If the SGSN 106 receives the SM message from the SMS-GMSC 102, the SGSN 106 determines whether the SM message has an error, and if it is determined that the SM message has no error, the SGSN 106 transmits the SM message to the terminal 110.

As the SMS described above, another messaging service is performed according to a specific rule between a client and a server. That is, since a silo for each messaging service is constructed, in order to employ a plurality of messaging services, a configuration of a terminal may be complicated.

In terms of interworking between heterogeneous messaging services, interworking between the SMS and the MMS and interworking between the SMS and an Internet E-mail service have been being provided. However, for interworking between an Instant Messaging (IM) service and the SMS, a basic architecture and a network element function are described in the $3^{rd}$ Generation Partnership Project (3GPP) standard, however, a detail process of processing an SMS message in order to transmit it as an IM message is not described. Thus, a new client for converging requirements to perform a plurality of messaging services and guaranteeing compatibility with existing messaging systems is required.

Meanwhile, in order to support a multimedia service in a mobile terminal and network, an Internet Protocol (IP) Multimedia Core Network (CN) Subsystem (IMS) function is defined in the 3GPP standard. An IMS network is a core of next generation mobile communication by providing core functions of IP multimedia communication, such as Session Initiation Protocol (SIP)-based session management, Quality of Service (QoS) management, interaction with a circuit network, and various additional services, such as security, charging, security and authentication, service profile management, user information storing, presence information and group information management. However, an IMS-based service is limited to an IM service based on PoC or SIP for IM and Presence Leveraging Extensions (SIMPLE). This is because a communication or messaging service based on IMS is still in an initial stage, i.e., a high-grade service based on IMS has not been developed. Thus, each messaging service can connect between only clients supporting the same messaging service. Technically, an existing user profile performs a proper service routing rule for only users having the same service characteristic.

SUMMARY OF THE INVENTION

An aspect of the present invention is to substantially solve at least the above problems and/or disadvantages and to provide at least the advantages below. Accordingly, an aspect of the present invention is to provide a system and method for providing a converged messaging service in which various messaging services, such as a Short Message Service (SMS), a Multimedia Message Service (MMS), and an Instant Messaging (IM) service, are converged.

Another aspect of the present invention is to provide an interface for defining and operating network elements for efficiently storing and managing messaging data in order to provide a converged messaging service.

A further aspect of the present invention is to provide a system and method for extending a routing rule based on a user service profile in order to provide compatibility with existing servers and clients providing an Internet Protocol (IP) Multimedia Core Network (CN) Subsystem (IMS)-based messaging service.

Another further aspect of the present invention is to provide a system and method for supporting a messaging service using recipient's service information in order to provide compatibility with existing servers and clients providing a legacy messaging service instead of the IMS-based messaging service.

According to one aspect of the present invention, there is provided a system for providing a converged messaging service, the system including an originating client for transmitting a message in the form of the converged messaging service, which contains a converged messaging service IDentification (ID) tag, to a Converged Messaging Server (CMS); the CMS for receiving the message and transmitting the message to a target network; and a target Session Initiation Protocol (SIP)/Internet Protocol (IP) core for, if the message is received and a target client supports an IP Multimedia Core Network (CN) Subsystem (IMS) service, translating the converged messaging service ID tag to an ID tag corresponding to a messaging service supported by the target client and transmitting a message containing the translated ID tag to the target client according to a process of the messaging service supported by the target client.

According to another aspect of the present invention, there is provided a system for providing a converged messaging service, the system including an originating client for transmitting a message containing a converged messaging service IDentification (ID) tag to a Converged Messaging Server (CMS); the CMS for receiving the message and transmitting the message to a target Session Initiation Protocol (SIP)/ Internet Protocol (IP) core; and the target SIP/IP core for storing a routing rule for transmitting a message using the converged messaging service, and if the message is received and a target client supports an IP Multimedia Core Network (CN) Subsystem (IMS) service, transmitting the message to the target client according to the routing rule.

According to another aspect of the present invention, there is provided a system for providing a converged messaging service, the system including a Converged Messaging Server (CMS) for checking a routing rule of the converged messaging service if a converged message is received using the converged messaging service, and storing the converged message in a Converged Messaging (CM) data storage if it is set to store the converged message in the CM data storage; and the CM data storage for storing the converged message.

According to another aspect of the present invention, there is provided a method of providing a converged messaging service, the method including an originating client transmitting a message containing a converged messaging service IDentification (ID) tag to a Converged Messaging Server (CMS); if the message is received, the CMS transmitting the message to a target Session Initiation Protocol (SIP)/Internet Protocol (IP) core; if the message is received, the target SIP/ IP core determining whether a target client supports an IP Multimedia Core Network (CN) Subsystem (IMS) service; and if it is determined that the target client supports the IMS service, the target SIP/IP core translating the converged messaging service ID tag to an ID tag corresponding to a messaging service supported by the target client and transmitting a message containing the translated ID tag to the target client according to a protocol of the messaging service supported by the target client.

According to another aspect of the present invention, there is provided a method of providing a converged messaging service, the method including an originating client transmitting a message containing a converged messaging service IDentification (ID) tag to a Converged Messaging Server (CMS); if the message is received, the CMS transmitting the message to a target Session Initiation Protocol (SIP)/Internet Protocol (IP) core; if the message is received and a target client supports an IP Multimedia Core Network (CN) Subsystem (IMS) service, the target SIP/IP core determining a pre-set routing rule for transmitting a message using the converged messaging service; and the SIP/IP core transmitting the message to the target client according to the determined routing rule.

The present invention defines an architecture and interfacing of a Converged Messaging Client (CMC) and a Converged Messaging Server (CMS), which are elements of a converged messaging service for being compatibly used with or replacing various services, such as an Instant Messaging (IM) service, a Short Message Service (SMS), a Multimedia Message Service (MMS), a Voice Over Internet Protocol (VoIP) service, and a Push To Talk (PTT) Over Cellular (PoC) service. In particular, the present invention provides a method of enabling interworking between heterogeneous messaging services in an application layer by expending IP Multimedia Core Network (CN) Subsystem (IMS) technology. The present invention also provides a method of defining a Converged Messaging (CM) data storage for supporting the converged messaging service and managing a message and metadata stored in the defined CM data storage.

BRIEF DESCRIPTION OF THE DRAWINGS

The above and other aspects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings in order to define interworking elements for guaranteeing compatibility between a converged messaging service according to an exemplary embodiment of the present invention and a conventional messaging service and describe functions of the interworking elements.

Figure 2:
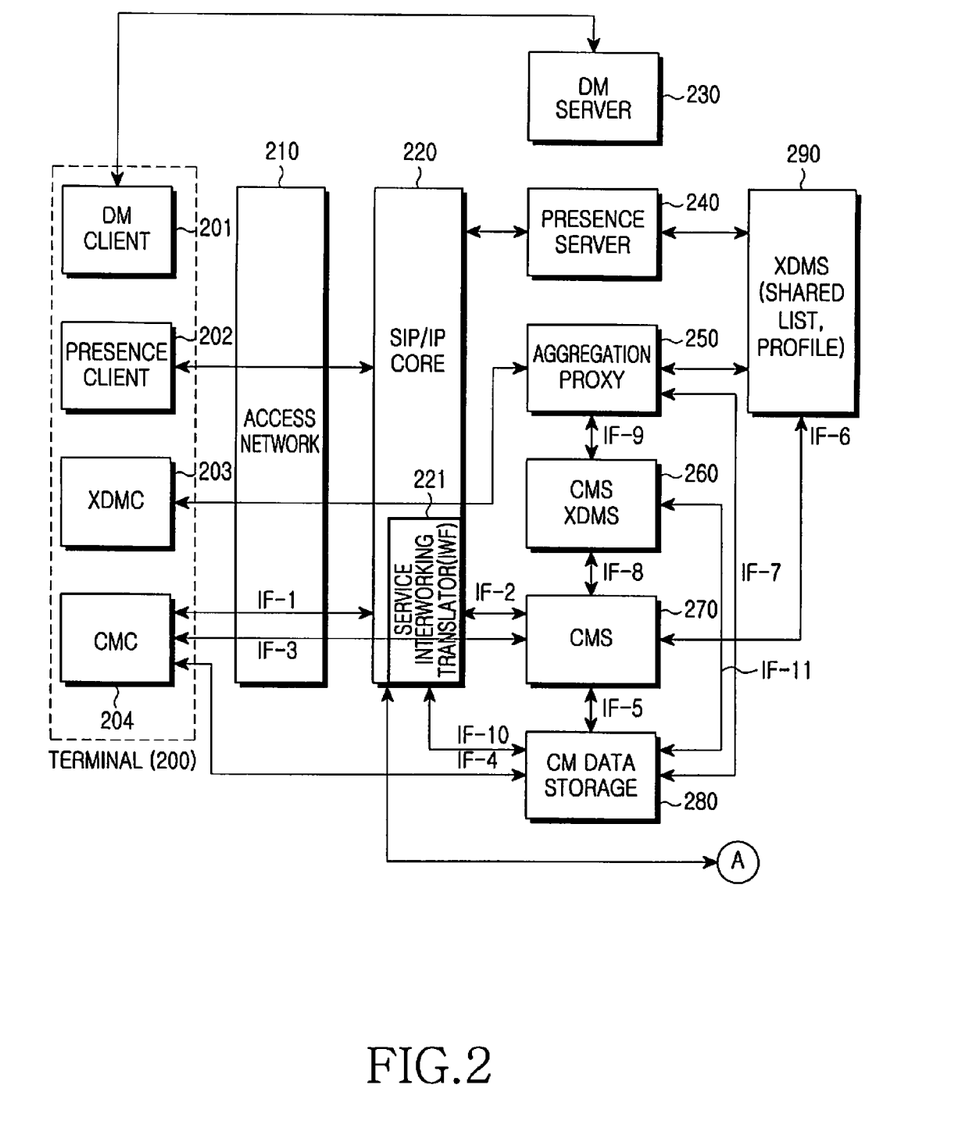
FIG. 2 is an architecture of a network including a Converged Messaging Client (CMC) and a Converged Messaging Server (CMS) based on IP Multimedia Core Network (CN) Subsystem (IMS) according to an exemplary embodiment of the present invention.

FIG. 2 is an architecture of a network including a Converged Messaging Client (CMC) and a Converged Messaging Server (CMS) based on IP Multimedia Core Network (CN) Subsystem (IMS) according to an exemplary embodiment of the present invention. As illustrated in FIG. 2, a converged messaging system according to an exemplary embodiment of the present invention may include a terminal 200, a CMS 270, a Converged Messaging (CM) data storage 280, and a service interworking translator 221. The converged messaging system may further include a Document Management (DM) server 230, a presence server 240, an aggregation proxy 250, a CMS eXtensible Markup Language (XML)-based Document Management Server (CMS XDMS) 260, and an XDMS 290. These components can be connected to each other via an access network 210 and a Session Initiation Protocol (SIP)/ Internet Protocol (IP) core 220.

The components will now be described.

The terminal 200 may include a DM client 201, a presence client 202, an XDM Client (XDMC) 203, and a CMC 204.

The CMC 204 is an independent messaging client for replacing requirements of a Multimedia Message Service (MMS) or an Instant Messaging (IM) service. The CMC 204 uses an IMS core network function and stores therein application programs for establishing a session using an SIP and an SIP extension protocol and transmitting a message in a paging mode.

Figure 4:
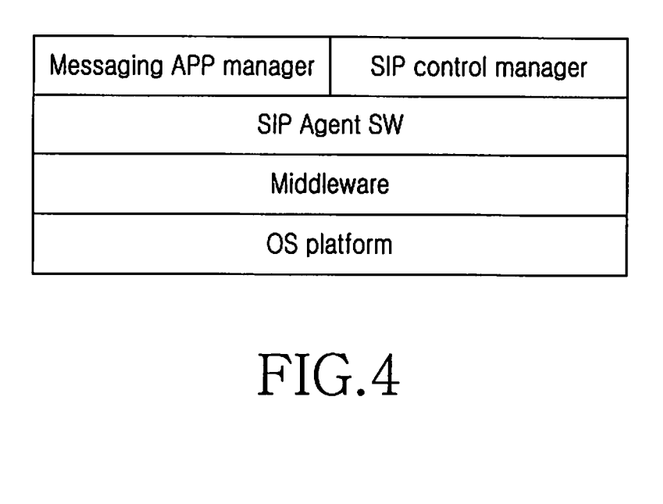
FIG. 4 illustrates a protocol stack of a CMC according to an exemplary embodiment of the present invention.

A protocol stack of the CMC 204 will now be described with reference to FIG. 4. The CMC 204 operates on a basic SIP agent SoftWare (SW) on a middleware on an Operating System (OS) platform. The CMC 204 includes an SIP control manager for controlling the SIP and a messaging APPlication (APP) manager for implementing messaging application management. The messaging APP manager can perform a function of distinguishing a converged messaging service IDentification (ID) tag from contents of a message to be transferred and managing them regardless of a messaging service type.

The CMS 270 is an application server for supporting the converged messaging service in an IMS network and receives a SIP message according to service tag information contained in the SIP message transmitted to the IMS network and a routing rule in IMS. The CMS 270 also transmits the received SIP message to corresponding target clients. In order to transmit the received SIP message to the corresponding target clients, the CMS 270 can transmit the received SIP message according to a service admission rule by checking the service admission rule from the XDMS 290 storing a service policy of the converged messaging service. If the received SIP message corresponds to a group messaging service request, the CMS 270 reads a group member list from the XDMS 290 and transmits the received SIP message to corresponding target clients. The SIP message is a general term, and may be a message containing content that a user desires to transmit or an INVITE message, which is a session establishment request message for transmission after session establishment.

In order to support the converged messaging service, the terminal 200 may include the XDM client 203 for providing a function of creating, managing, modifying, and deleting an XML document, such as the service policy or an access rule related to the converged messaging service, the presence client 202 for requesting to create, modify, or read presence information provided in IMS, and the DM client 201 for transmitting management objects, such as an internal firmware upgrade object, a bootstrapping object, and a terminal function monitoring object.

The CMS 270 is associated with the shared XDMS 290 for storing information related to the converged messaging service and interfaces with both the CMS XDMS 260 for storing an access rule unique to the converged messaging service and the shared XDMS 290 for storing a group list.

The converged messaging system defines the CM data storage 280 for storing a converged message created by performing the converged messaging service.

Figure 5:
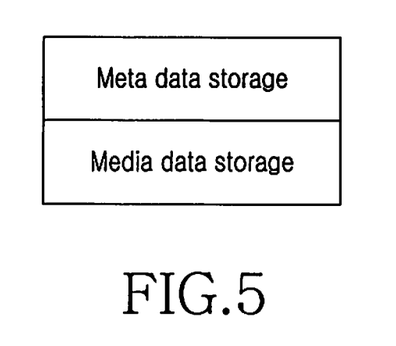
FIG. 5 is a configuration of a Converged Messaging (CM) data storage according to an exemplary embodiment of the present invention.
Figure 6:
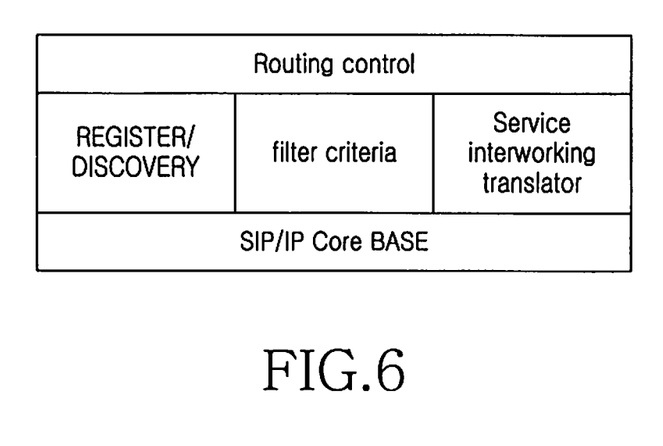
FIG. 6 is a configuration of an IMS core network function according to an exemplary embodiment of the present invention.

FIG. 5 is a configuration of the CM data storage 280 according to an exemplary embodiment of the present invention. Referring to FIG. 5, the CM data storage 280 can include a metadata storage for storing metadata of a message transferred using the converged messaging service and a media data storage for storing actual media data. The metadata is control information for managing stored media data, such as a sender ID, a storing date and time, message length information, media type and COder/DECoder (CODEC) information, and a message title. The metadata storage stores hardware information for accessing stored message data so that a job, such as call, deletion, or name modification of a stored message, can be performed by means of the metadata. The metadata is stored as an XML document, and in particular, a unique namespace is defined in order to inform that the metadata is an XML document defined in the converged messaging service. The unique namespace can be expressed by "xmlns="urn:oma:params:xml:ns:cpm:storage-metadata"" Thus, the terminal 200 can manage stored message data by transmitting an SIP message containing the unique namespace, i.e., an XML document identifier.

Interfaces defined between elements constructing the converged messaging system illustrated in FIG. 2 will now be described.

IF-1 denotes a first interface between the CMC 204 and the SIP/IP core 220, and IF-2 denotes a second interface between the SIP/IP core 220 and the CMS 270. IF-1 and IF-2 are interfaces between the CMC 204 and the IMS network, support the SIP, and respectively perform a function of establishing a session between the CMC 204/the CMS 270 and the SIP/IP core 220 and transmitting an SIP message.

IF-3 denotes a third interface between the CMC 204 and the CMS 270 and is a user data channel for media transmission after SIP session establishment between the CMC 204 and the CMS 270, and a protocol, such as a Real-time Transport Protocol (RTP) or a Real-time Transport Control Protocol (RTCP), can be used for IF-3.

IF-4 denotes a fourth interface between the CMC 204 and the CM data storage 280 and is used in order for the CMC 204 to retrieve a message stored in the CM data storage 280, and a protocol, such as a Real Time Streaming Protocol (RTSP), can be used for IF-4.

IF-5 denotes a fifth interface between the CMS 270 and the CM data storage 280 and is used in order for the CMS 270 to retrieve a message stored in the CM data storage 280, and if necessary, can be used as an interface to store a message transmitted to the CMS 270.

IF-6 denotes a sixth interface between the CMS 270 and the shared XDMS 290 and is used in order for the CMS 270 to call member list information from the shared XDMS 290 to perform the group messaging service.

IF-7 denotes a seventh interface between the aggregation proxy 250 and the CM data storage 280 and is an interface for transmitting an XML Configuration Access Protocol (XCAP) message requested by the XDMC 203 to the CM data storage 280. IF-7 uses the XCAP and is used as an interface used in order for the XDMC 203 to manage metadata stored in the CM data storage 280. The XCAP used in IF-7 is a standard protocol for accessing an XML document and can provide a function of modifying, deleting, and managing metadata identified using a namespace stored in the CM data storage 280.

In order to access metadata stored in the CM data storage 280, the XDMC 203 requests an XCAP message containing an Application Unique ID (AUID). The AUID used to access metadata stored in the CM data storage 280 according to an exemplary embodiment of the present invention can be set to a value, such as 'org.openmobilealliance.cpm-metadata'. This AUID information is used in order for the aggregation proxy 250 to route an XCAP message to the CM data storage 280. The XDMC 203 can search for message management information, such as a sender ID, time information, and length, stored in the CM data storage 280 and perform a job, such as deletion or title change of a stored message, using the XCAP message. A CM user can simultaneously delete message data by deleting corresponding metadata stored in the CM data storage 280 by means of the XDMC 203.

IF-8 and IF-9 denote eighth and ninth interfaces, respectively, for connecting the aggregation proxy 250 and the CMS 270 to the CMS XDMS 260 and manage an XML document using the XCAP. IF-8 is an interface between the CMS 270 and the CMS XDMS 260, wherein the CMS 270 manages an XML document stored in the CMS XDMS 260. IF-9 is an interface between the aggregation proxy 250 and the CMS XDMS 260.

IF-10 denotes a tenth interface between the SIP/IP core 220 and the CM data storage 280. IF-10 is an interface between the IMS network and the CM data storage 280 and is an interface between the IMS core network and the CM data storage 280 to transmit an SIP message to the CM data storage 280 according to the IMS routing rule.

IF-11 denotes an eleventh interface between the CMS XDMS 260 and the CM data storage 280.

The CMC 204 transmits an SIP MESSAGE message containing multimedia or an SIP INVITE message for session establishment to the CMS 270 in a home network in order to transfer the message to a network of a target client using the routing function of the IMS core network. The routing function of the SIP message can be performed by applying a service tag for identifying the converged messaging service, e.g., "+g.oma.cpm", and filter criteria using the service tag.

Figure 3:
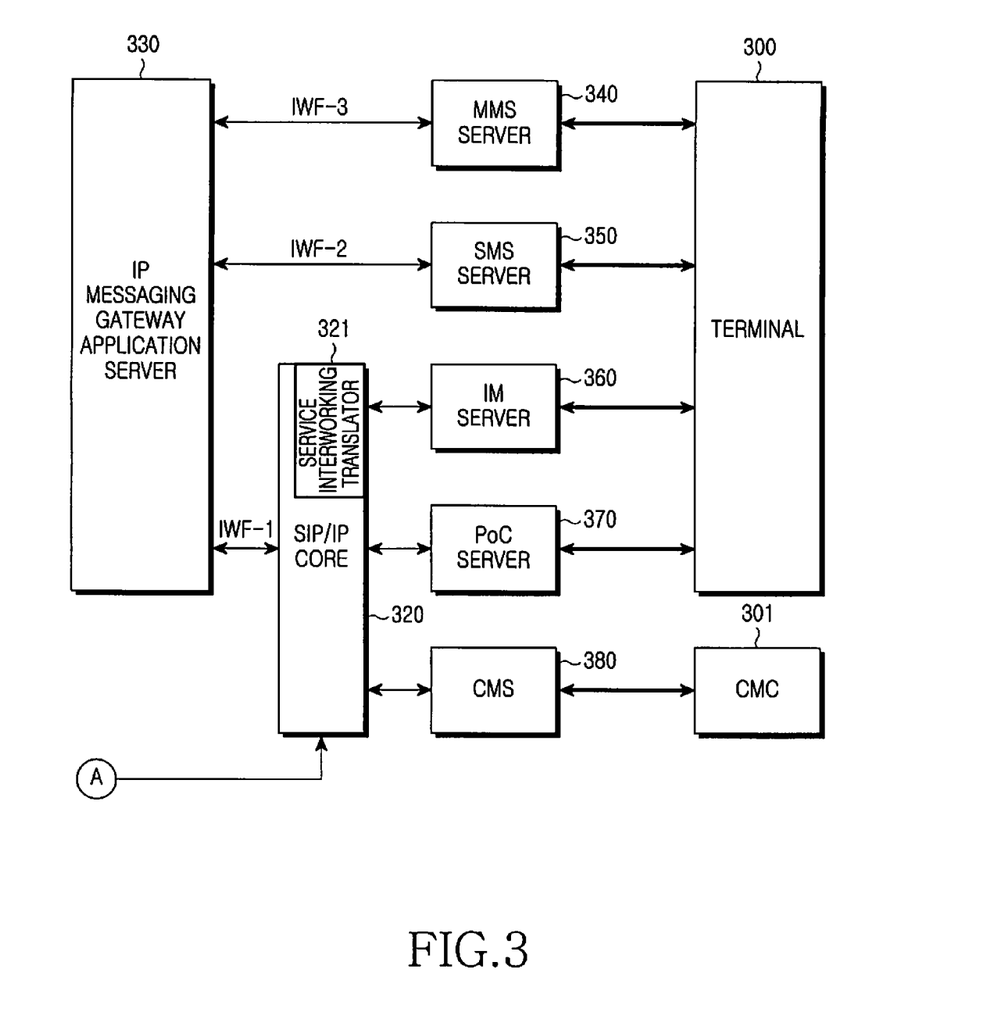
FIG. 3 is an architecture of a target network for performing a requested converged messaging service when the converged messaging service is requested from an originating network in a converged messaging system illustrated in FIG. 2, according to an exemplary embodiment of the present invention.

FIG. 3 is an architecture of a target network for performing a requested converged messaging service when the converged messaging service is requested from an originating network in the converged messaging system illustrated in FIG. 2, according to an exemplary embodiment of the present invention.

Referring to FIG. 3, a converged messaging system performing a function of the target network includes an MMS server 340, a Short Message Service (SMS) server 350, an IM server 360, and a Push To Talk (PTT) over Cellular (PoC) server 370, and in particular, further includes a CMS 380 according to an exemplary embodiment of the present invention. The converged messaging system also includes an IP messaging gateway application server 330 and an SIP/IP core 320, which is an IMS network containing a service interworking translator 321.

A SIP message transmitted to a target IMS core network using a service tag for identifying the converged messaging service as illustrated in FIG. 2 is processed in two methods according to whether a target client supports an IMS service, according to an exemplary embodiment of the present invention.

Firstly, a case where the target client does not support the IMS service will now be described.

When the target client is an SMS support client or an MMS support client, the SIP message is transmitted to a corresponding application server, which provides a function of translating the SIP message to a specific message format according to registration information of the target client, via the IP messaging gateway application server 330. That is, the IP messaging gateway application server 330 transmits the SIP message to the MMS server 340 or the SMS server 350 according to a messaging service type supported by the target client so that the SIP message is translated to an SMS or MMS message. For example, a large sized text or image message transferred as an SIP MESSAGE message can be re-sized to proper sized SMS or MMS messages and transmitted. When the SIP message is an SIP INVITE message for session establishment, since this case is out of the scope of the present invention, this case is not described in the specification.

Secondly, a case where the target client supports the IMS service will now be described.

When the target client uses a SIMPLE IM service, a PoC service, or a Voice over Internet Protocol (VoIP) service and has registered its service profile information in the IMS core network, service interworking is performed according to a function of the IMS core network. For the service interworking in an application layer, the present invention suggests a method of extending the routing rule of the IMS core network. The method of extending the routing rule will now be described.

In order to help the understanding of an operation, it is assumed that the target client has registered a specific messaging service, i.e., the PoC service. According to the prior art, it is determined whether the SIP message received to the SIP/IP core 320, which is the target IMS core network, contains a service tag '+g.poc.talkburst', and if it is determined that the SIP message does not contain the service tag '+g.poc.talkburst', the SIP/IP core 320 responds an SIP error message. This is a result obtained by observing a fixed filter rule containing only the registered PoC service tag. However, according to an exemplary embodiment of the present invention, by expending the fixed filter rule, when the SIP message, i.e., an SIP INVITE message or an SIP MESSAGE message, contains the converged messaging service tag '+g.oma.cpm', even if the target client has registered only the PoC service, the SIP message can be routed to the PoC server 370. As described above, the method of transmitting an SIP message containing the converged messaging service tag to a corresponding application server so as to transmit a corresponding message to the target client can be implemented by the following two methods.

The first method includes the service interworking translator 321 for automatically translating the converged messaging service tag to a service tag corresponding to a messaging service supported by the target client in the IMS core network, in more detail, in an S-CSCF. For example, the converged messaging service tag '+g.oma.cpm' contained in the SIP message is automatically translated to '+g.poc.talkburst' and transmitted to the PoC server 370. In the service tag translation, the converged messaging service tag is translated to a service tag for transmitting the SIP message according to a supportable messaging service by determining which messaging service is supported by the target client. The SIP message is transmitted to a terminal 300 including a PoC client via the PoC server 370 according to a PoC process so that a session is established or the SIP message is transferred. In the case of session establishment, the terminal 300 including a PoC client transmits a 200 OK response message in response to the SIP INVITE message, wherein the 200 OK message responds to the SIP message by passing through the PoC server 370, being translated to the converged messaging service tag by the service interworking translator 321 in the SIP/IP core 320, and being transmitted to the originating network. This first method has an advantage in that message routing can be performed without modifying the filter rule pre-defined in the SIP/IP core 320.

Figure 8:
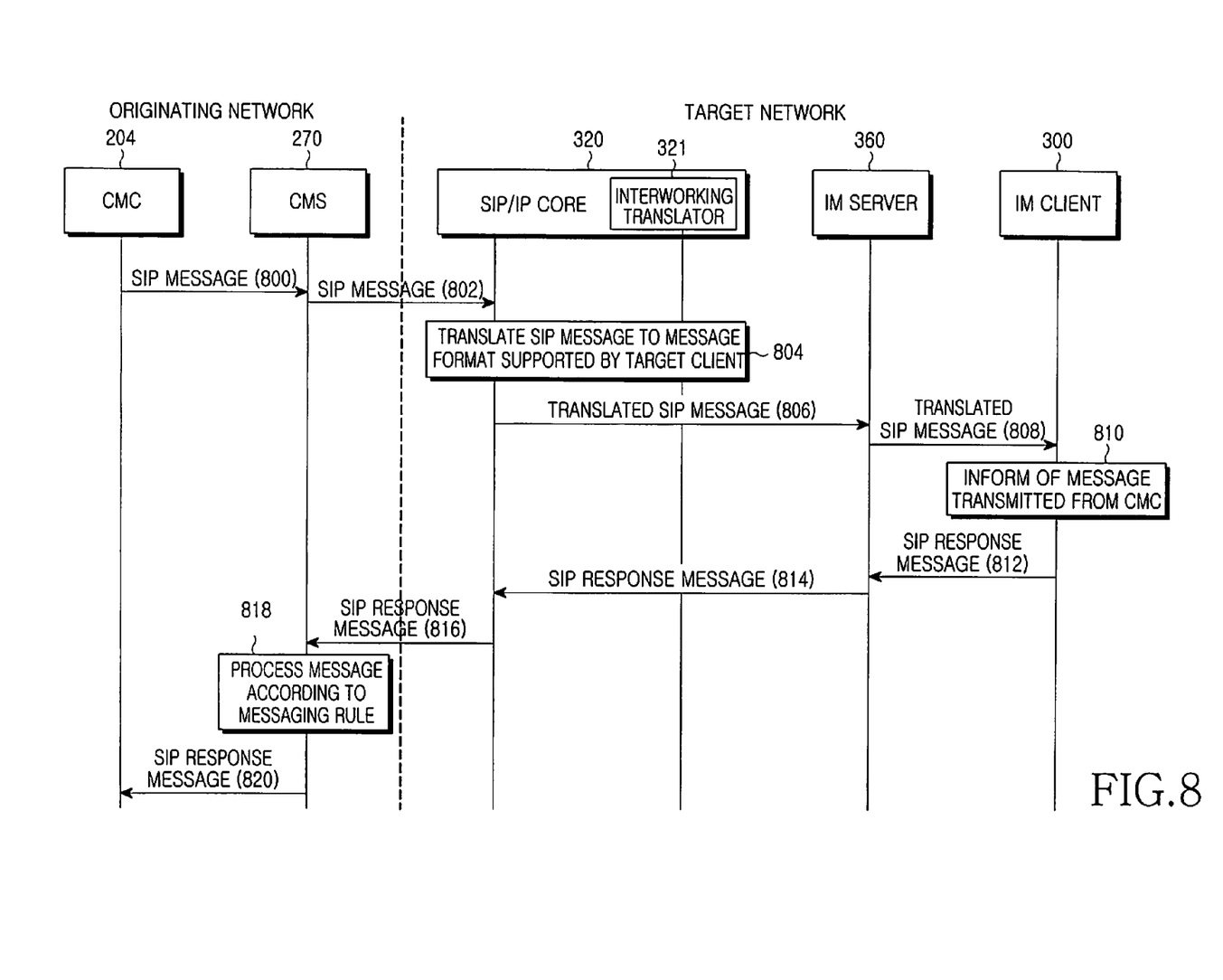
FIG. 8 is a signaling diagram of a process of transmitting and receiving a Session Initiation Protocol (SIP) message in a converged messaging system according to an exemplary embodiment of the present invention.

FIG. 8 is a signaling diagram of a process of transmitting and receiving a SIP message in the converged messaging system illustrated in FIGS. 2 and 3 using the first method according to the present invention.

Referring to FIG. 8, the CMC 204 transmits an SIP message to the CMS 270 and the SIP/IP core 320 in a target network via the SIP/IP core 220 in steps 800 and 802. The SIP message is a converged message containing the converged messaging service tag.

If the received SIP message contains the converged messaging service tag '+g.oma.cpm', the SIP/IP core 320 in the target network determines which messaging service is supported by a target client. The SIP/IP core 320 translates the converged messaging service tag to a service tag for transmitting the received SIP message according to the messaging service supported by the target client in step 804. In the current embodiment, it is assumed that the target client is an IM client 300. Thus, SIP/IP core 320 translates the converged messaging service tag to an IM service tag by means of the service interworking translator 321 and transmits the translated SIP message to the IM server 360 in step 806 so that the SIP message can be transmitted to the IM client 300 according to a typical IM service process in step 808. In this case, the SIP message containing the translated service tag may further contain information indicating a message transmitted from the CMC 204.

The IM client 300, which has received the SIP message containing the information indicating a message transmitted from the CMC 204, informs a user that a currently received message is a message transmitted from the CMC 204 in step 810.

According to a response of the user, the IM client 300 transmits a SIP response message to the originating network in steps 812 through 816. In this case, the IM client 300 may insert service tag information for informing of the IM service into the SIP response message. The CMS 270 determines whether the SIP response message contains IM client service tag information, and if it is determined that the SIP response message contains the IM client service tag information, the CMS 270 processes the SIP response message according to a messaging rule in step 818 and transmits the processed SIP response message to the CMC 204 in step 820. For example, when the messaging rule is set so that the SIP response message contain only the converged messaging service tag, the CMS 270 may processes the SIP response message in step 818 so that the SIP response message contain only the converged messaging service tag and transmit the processed SIP response message to the CMC 204 in step 820.

The second method is a method of extending the filter rule, wherein the filter rule additionally defines a routing rule of the converged messaging service tag even when the PoC service is registered. That is, the second method is a method of transmitting a received SIP message to the PoC server 370 according to the defined routing rule of the converged messaging service tag. The second method has an advantage in that service interworking can be supported with a simple filter rule upgrade of a service provider. In addition, even in the case of a counter transmitting and receiving scenario, i.e., in the case where a sender is a PoC client and a recipient is a CMC, a SIP message received from the PoC client can be processed by expending a registered filter rule of the CMC in the same manner.

Figure 7:
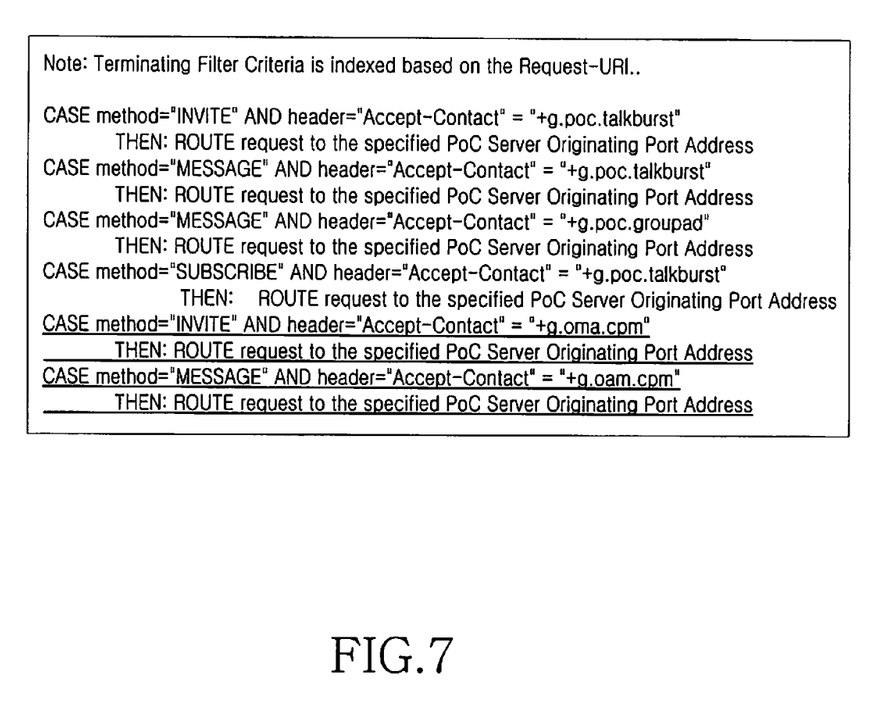
FIG. 7 illustrates extension of a Push To Talk (PTT) Over Cellular (PoC) service filter rule in order to perform service interworking according to an exemplary embodiment of the present invention.

An example of a filter rule for routing a received SIP message by being extended using the second method will now be described with reference to FIG. 7. FIG. 7 illustrates extension of a PoC service filter rule registered in a target IMS core network in order to perform service interworking according to an exemplary embodiment of the present invention. That is, if an SIP INVITE message or an SIP MESSAGE message contains the converged messaging service tag in an 'Accept-Contact' header, an additional filter rule for routing the message is defined. In this case, an originating IMS core network may insert an additional PoC service tag into the SIP INVITE message or the SIP MESSAGE message and transmit the SIP INVITE message or the SIP MESSAGE message. A target PoC client may be informed using the converged messaging service tag contained in the original SIP message that the SIP message is transmitted from a CMC. Although an illustration of extending the registered PoC service filter rule has been described in FIG. 7, in an IM service filter rule, a routing rule for processing a received converged message also can be additionally extended by extending a unique IM routing rule.

As described above, the present invention provides that when the converged message service network uses SIP/IP network and there is an interworking, a convergence message is directly switched to an IP Service network such as IM/POC network, etc., according to the routing rule of the interworking without being controlled by CMS.

In this case, the present invention includes a step of receiving by an SIP-based service (an IMS network) or a converged messaging service network a message from a recipient A and determining whether the recipient is a CPM subscriber, a step of forwarding the message to a CPM user after sending the message to a CPM server if it is determined that the recipient is a CPM subscriber, and a step of sending, if it is determined that the recipient is not a CPM subscriber, the message to an interworking translator and changing a feature tag according to a routing rule of the interworking translator. Here, the 'feature tag' refers to a type for changing a message format for sending a message by an SIP network-based service such as IM/POC. In this case the CPM Server is identical to the above-described CMS. In the changing step, the interworking translator determines which service the recipient user uses. If the recipient uses the IM service, the interworking translator changes a CPM feature tag included in the received message to an IM feature tag. If the recipient uses the PoC service, the interworking translator changes the CPM feature tag to a PoC feature tag. In this way, if the recipient uses the IMS-based service other than CPM, the interworking translator changes the CPM feature tag to a feature tag of the corresponding service. Thereafter, the changed message is sent back to the SIP-based service (IMS network) or the converged messaging service network, and then sent to each IP service network.

In addition, SMS/MMS is processed in the interworking translator stated above. That is, upon receipt of a message from the IMS network, the interworking translator determines which service the recipient uses. If it is determined that the recipient uses SMS or MMS, the interworking translator changes the corresponding message into the SMS format or MMS format, and then sends it to the SMS server or MMS server. If there is a separate interworking translator for each of SMS, MMS, IM and PoC, and if the IMS network can determine that the recipient user uses the IMS-based service such as IM and PoC services, the IMS network delivers the message to the interworking translator for the corresponding IM or PoC. If it is determined that the IMS network delivers the message to the IM interworking translator, the IM interworking translator changes a feature tag of the received message to an IM feature tag, and then sends the message to the IMS network, and the IMS network sends the message to the IM server according to the routing rule. The latter method is different from the former method in that if the recipient user uses the IMS-based service, the IMS network can determine which service the recipient uses.

And furthermore, the present invention provides that SIP/IP core networking includes a service interworking translator according to an exemplary embodiment of the present invention, but the service interworking translator can be equipped separately. In a case where an interworking translator is equipped separately from a SIP/IP network, the converged message is routed from the SIP/IP core network to the corresponding IP service network through the interworking translator.

As described above, according to the present invention, by suggesting a CMC, a CMS, and a CM data storage to provide an MMS based on IMS that is to be used as a core network of a mobile communication service, various existing messaging service systems can be converged. In addition, interworking with a VoIP or PoC service, which is a similar messaging service based on IMS, can be performed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A server for providing a converged messaging service, the server comprising:
   an interface configured for receiving a first message from an originating client; and
   a controller configured for:
   determining whether the first message includes a converged messaging service IDentification (ID) tag or an Internet protocol Multimedia core network Subsystem (IMS)-based messaging service ID tag, the converged messaging service ID tag identifying the converged messaging service in which at least two different messaging services are converged;
   when the first message includes the IMS-based messaging service ID tag, controlling the interface to transmit the first message including the IMS-based messaging service ID tag to a target client supporting an IMS-based messaging service;
   when the first message includes the converged messaging service ID tag and the target client does not support the converged messaging service, determining whether the target client supports the IMS-based messaging service, and translating the converged messaging service ID tag to the IMS-based messaging service ID tag and controlling the interface to transmit a second message including the IMS-based messaging service ID tag to the target client, when the target client supports the IMS-based messaging service; and
   when the first message includes the converged messaging service ID tag and the target client supports the converged messaging service, controlling the interface to transmit the first message including the converged messaging service ID tag to the target client.

2. The server of claim 1, wherein the originating client is a Converged Messaging Client (CMC), which is an independent messaging client replacing requirements of at least one of a Multimedia Message Service (MMS) or an Instant Message (IM) service.

3. The server of claim 2, wherein the originating client comprises:
   a Session Initiation Protocol (SIP) control manager for controlling an SIP; and
   a messaging APPlication (APP) manager for performing a function of distinguishing the converged messaging service ID tag from contents of a message to be transferred and managing them regardless of a messaging service type.

4. The server of claim 2, wherein the CMC reads messages in the form of the converged messaging service stored in a CM data storage using a Real-Time Streaming Protocol (RTSP).

5. The server of claim 4, wherein the CM data storage comprises:
   a metadata storage for storing metadata of a message transferred using the converged messaging service; and
   a media data storage for storing actual media data,
   wherein the metadata is control information for managing stored media data including at least one of a sender ID, a storing date and time, message length information, media-type information, COder/DECoder (CODEC) information, and a message title.

6. The server of claim 1, wherein the interface is included in a Session Initiation Protocol (SIP)/Internet Protocol (IP) core.

7. The server of claim 1, wherein the controller is further configured for:
   when the first message includes the converged messaging service ID tag and the target client does not support any of the converged messaging service and the IMS-based messaging service, translating the converged messaging service ID tag to a Short Message Service (SMS) ID tag or a Multimedia Message Service (MMS) ID tag, converting the first message into SMS or MMS messages, and controlling the interface to transmit SMS or MMS messages including the SMS ID tag or the MMS ID tag to the target client.

8. A server for providing a converged messaging service, the server comprising:
   an interface configured for receiving a first message from an originating client; and
   a controller configured for:
   controlling the interface to transmit the first message to a Session Initiation Protocol (SIP)/Internet Protocol (IP) core,
   wherein the SIP/IP core is configured to:
   determine whether the first message includes a converged messaging service IDentification (ID) tag or an Internet protocol Multimedia core network Subsystem (IMS)-based messaging service ID tag, the converged messaging service ID tag identifying the converged messaging service in which at least two different messaging services are converged;

when the first message includes the IMS-based messaging service ID tag, transmit the first message including the IMS-based messaging service ID tag to a target client supporting an IMS-based messaging service;

when the first message includes the converged messaging service ID tag and the target client does not support the converged messaging service, determine whether the target client supports the IMS-based messaging service, and translate the converged messaging service ID tag to the IMS-based messaging service ID tag and transmit a second message including the IMS-based messaging service ID tag to the target client, when the target client supports the IMS-based messaging service; and when the first message includes the converged messaging service ID tag and the target client supports the converged messaging service, transmit the first message including the converged messaging service ID tag to the target client.

9. The server of claim 8, wherein the originating client is a Converged Messaging Client (CMC), which is an independent messaging client replacing requirements of at least one of a Multimedia Message Service (MMS) or an Instant Message (IM) service.

10. The server of claim 9, wherein the originating client comprises:
    an SIP control manager for controlling the SIP; and
    a messaging APPlication (APP) manager for performing a function of distinguishing the converged messaging service ID tag from contents of a message to be transferred and managing them regardless of a messaging service type.

11. The server of claim 8, wherein the controller transmits the first message to target clients according to a corresponding service admission rule by checking a service admission rule of each client and a group member list stored in an eXtensible Markup Language (XML)-based Document Management Server (XDMS).

12. The server of claim 11, wherein when the first message is a group messaging service request, the controller reads the group member list from the XDMS and transmits the first message to corresponding target clients.

13. The server of claim 8, wherein the SIP/IP core is further configured to:
    when the first message includes the converged messaging service ID tag and the target client does not support any of the converged messaging service and the IMS-based messaging service, translate the converged messaging service ID tag to a Short Message Service (SMS) ID tag or a Multimedia Message Service (MMS) ID tag, convert the first message into SMS or MMS messages, and control the interface to transmit SMS or MMS messages including the SMS ID tag or the MMS ID tag to the target client.

14. A terminal for providing a converged messaging service, the terminal comprising:
    a Converged Messaging Client (CMC) configured for generating a first message in the form of the converged messaging service, which includes a converged messaging service IDentification (ID) tag for identifying the converged messaging service in which at least two different messaging services are converged; and
    an interface for transmitting the first message to a Session Initiation Protocol (SIP)/Internet Protocol (IP) core,
    wherein the SIP/IP core is configured to:
    determine whether the first message includes a converged messaging service IDentification (ID) tag or an Internet protocol Multimedia core network Subsystem (IMS)-based messaging service ID tag, the converged messaging service ID tag identifying the converged messaging service in which at least two different messaging services are converged;
    when the first message includes the IMS-based messaging service ID tag, transmit the first message including the IMS-based messaging service ID tag to a target client supporting an IMS-based messaging service;
    when the first message includes the converged messaging service ID tag and the target client does not support the converged messaging service, determine whether the target client supports the IMS-based messaging service, and translate the converged messaging service ID tag to the IMS-based messaging service ID tag and transmit a second message including the IMS-based messaging service ID tag to the target client, when the target client supports the IMS-based messaging service; and
    when the first message includes the converged messaging service ID tag and the target client supports the converged messaging service, transmit the first message including the converged messaging service ID tag to the target client.

15. The terminal of claim 14, wherein the CMC is an independent messaging client replacing requirements of at least one of a Multimedia Message Service (MMS) or an Instant Message (IM) service.

16. The terminal of claim 14, further comprising:
    an SIP control manager for controlling the SIP; and
    a messaging APPlication (APP) manager for performing a function of distinguishing the converged messaging service ID tag from contents of a message to be transferred and managing them regardless of a messaging service type.

17. The terminal of claim 14, wherein the CMC reads messages in the form of the converged messaging service stored in a CM data storage using a Real-Time Streaming Protocol (RTSP).

18. The terminal of claim 14, further comprising:
    an XML-based Document Management Client (XDMC) for transmitting a request message for managing data stored in a CM data storage,
    wherein an XML Configuration Access Protocol (XCAP) is used between an aggregation proxy for transferring the request message transmitted from the XDMC and the CM data storage in order for the XDMC to transmit the request message to the CM data storage via the aggregation proxy.

19. The terminal of claim 18, wherein the CM data storage comprises:
    a metadata storage for storing metadata of a message transferred using the converged messaging service; and
    a media data storage for storing actual media data,
    wherein the metadata is control information for managing stored media data including at least one of a sender ID, a storing date and time, message length information, media-type information, COder/DECoder (CODEC) information, and a message title.

20. The terminal of claim 14, wherein the SIP/IP core is further configured to:
    when the first message includes the converged messaging service ID tag and the target client does not support any of the converged messaging service and the IMS-based messaging service, translate the converged messaging service ID tag to a Short Message Service (SMS) ID tag or a Multimedia Message Service (MMS) ID tag, convert the first message into SMS or MMS messages, and control the interface to transmit SMS or MMS messages including the SMS ID tag or the MMS ID tag to the target client.

* * * * *